United States Patent
Zhuo et al.

(10) Patent No.: US 11,301,352 B2
(45) Date of Patent: Apr. 12, 2022

(54) SELECTING METRICS FOR SYSTEM MONITORING

(71) Applicant: International Business Machines Corporation, Armonk, NY (US)

(72) Inventors: Ling Zhuo, Beijing (CN); Yi Dai, Beijing (CN); Yin Xia, Beijing (CN); Ying Cao, Beijing (CN); Enzhong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/003,386

(22) Filed: Aug. 26, 2020

(65) Prior Publication Data

US 2022/0066900 A1     Mar. 3, 2022

(51) Int. Cl.
  *G06F 11/00*  (2006.01)
  *G06F 11/34*  (2006.01)
  *G06F 11/30*  (2006.01)

(52) U.S. Cl.
  CPC ...... *G06F 11/3409* (2013.01); *G06F 11/3006* (2013.01); *G06F 11/3075* (2013.01); *G06F 11/3466* (2013.01)

(58) Field of Classification Search
  CPC ............ G06F 11/3409; G06F 11/3452; G06F 11/079; G06F 11/34
  See application file for complete search history.

(56) References Cited

U.S. PATENT DOCUMENTS

| | | | |
|---|---|---|---|
| 9,558,056 B2* | 1/2017 | Sasturkar | H04L 43/04 |
| 2006/0235778 A1 | 10/2006 | Razvi | |
| 2016/0162588 A1* | 6/2016 | Tuchman | G06F 16/3344 707/722 |
| 2017/0085448 A1 | 3/2017 | Garrett | |
| 2017/0236081 A1* | 8/2017 | Grady Smith | G06Q 10/067 705/7.36 |
| 2017/0257292 A1 | 9/2017 | Coates | |
| 2019/0108265 A1 | 4/2019 | Barmentloo | |
| 2020/0012938 A1 | 1/2020 | Malhotra | |

OTHER PUBLICATIONS

Jin et al., "Toward Predictive Fault Tolerance in a Core-Router System: Anomaly Detection Using Correlation-Based Time-Series Analysis", IEEE Transactions on Computer-Aided Design of Integrated Circuits and Systems, vol. 37, No. 10, Oct. 2018, pp. 2111-2124.

Mell et al., "The NIST Definition of Cloud Computing", Recommendations of the National Institute of Standards and Technology, Special Publication 800-145, Sep. 2011, 7 pages.

* cited by examiner

*Primary Examiner* — Charles Ehne
(74) *Attorney, Agent, or Firm* — David K. Mattheis; Maeve M. Carpenter

(57) ABSTRACT

Ranking system metrics for monitoring by sorting members of a set of system metrics into correlation groups according to correlations among historic time series data, determining a sensitivity of the members of the set of system metrics, determining an importance of the members of the set of system metrics according to the correlation groups and sensitivity, and ranking the members of the set of system metrics according to the importance.

20 Claims, 4 Drawing Sheets

SELECTING METRICS FOR SYSTEM MONITORING

BACKGROUND

The disclosure relates generally to computer-based hierarchical analysis of system metrics. The disclosure relates particularly to ranking system metrics for real-time system monitoring and analysis according to domain expertise, statistical and machine learning analysis of system metric time series data, and the desired number of metrics for monitoring.

In IT operation domains, health care systems, electricity generation and distribution systems, and Internet of Things systems there are efforts to monitor and display real time performance for hundreds of subsystems, and thousands of data metrics. A system such as a DB2z, database management system on a mainframe, collects thousands of metrics each minute, and thousands of records for hundreds of metrics every second. Such systems generate and collect huge volumes of time series data.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable ranking system metrics for real-time monitoring and analysis.

Aspects of the invention disclose methods, systems and computer readable media associated with ranking system metrics for monitoring by sorting members of a set of system metrics into correlation groups according to correlations among historic time series data of the system metrics, determining a sensitivity of the members of the set of system metrics, determining an importance of the members of the set of system metrics according to the correlation groups and sensitivity, and ranking the members of the set of system metrics according to the importance.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
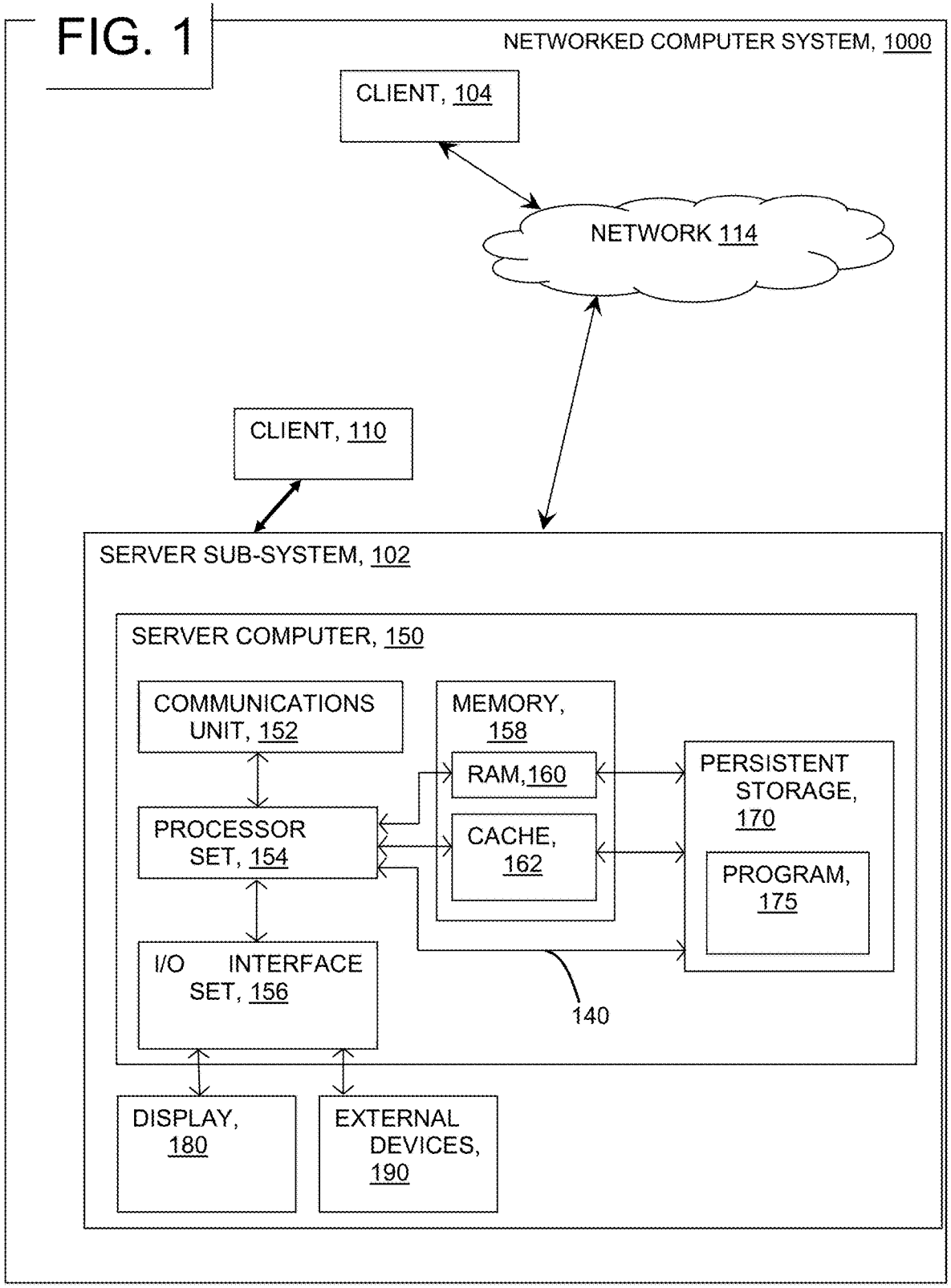
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., grouping system metrics according to correlation levels, determining sensitive features, determining relative importance of system metrics according to sensitive features and correlation groupings, selecting the N most important metrics for monitoring or analysis, etc.). These solutions are not abstract and cannot be performed as a set of mental acts by a human due to the processing capabilities needed to facilitate system metrics to be monitored, for example. Further, some of the processes performed may be performed by a specialized computer for carrying out defined tasks related to system metric selection. For example, a specialized computer can be employed to carry out tasks related to selecting system metrics for monitoring and analysis or the like.

Extensive systems, including hundreds or thousands of data collection points and the associated millions of data records, represent vast collections of raw data. As an example, a health care data base may include thousands of different data fields relating to individual records and system performance measures. Similarly, a big data set associated with an extensive IoT system may include thousands of unique data metrics associated with individual sensors as well as system performance measures. Such systems may rely exclusively upon domain experts to select metrics for monitoring and analysis.

Identifying selected data metrics from among the thousands of raw data metrics for close monitoring enables judicious use of scarce monitoring resources to effectively capture data anomalies indicative of system issues. Selecting appropriate data metrics further enables system performance monitoring and fault analysis without a resource and cost prohibitive requirement that all metrics be monitored. Disclosed systems and methods enable the automated selection of important system metrics, specific to each system and most significant to the monitoring and analysis of system performance. Such automated selection enables effective monitoring of system performance without excessive resource use or the monitoring of redundant metrics.

In an embodiment, the method receives system metric rankings of system key performance indicators (metrics) according to system metric functional areas, from a system domain expert. The method performs statistical analyses of historic time series data to group system metrics according to the level of correlation between metrics. The method further considers lag correlation—analyzing pairs of metrics for correlation after compensating for a lagging response between the pair of metrics. The method identifies anomaly patterns in the historic data as well as system metric status changes. The method identifies status changes as normal or abnormal. The method groups metrics according to the normal/abnormal classifications. The method utilizes a feature selection algorithm to identify the top N metrics from the abnormal group.

The method combines the domain expert ranking, correlation grouping by statistical analysis of metric time-series data, and machine learning-based anomaly identification of metrics and preforms a combinatorial analysis of the combined data to select the top N metrics from the overall set of metrics. The method may weigh the data according to the various data sources and further in terms of a user defined number of desired metrics for the output.

In an embodiment, the method receives input from one or more domain experts regarding the classification and relative importance of the system metrics. In this embodiment, a domain expert divides the overall set of available system metrics into categories using system metric descriptions. The categories are associated with the system metric functions as set forth in the system metric descriptions. In this embodiment, the domain expert further rates each metric according to how well known or important the expert considers the system metric to be, creating a set of ranked tiers of the system metrics. For example, the expert may rate: (i) system metrics considered important as 1 rated, or critical, (ii) "nice to have" metrics as 0.8 rated, and (iii) all other metrics as 0.5 rated, or "normal". The output from the domain expert includes a ranked tiering or hierarchical tree having system metrics grouped by functional area and also relative importance.

In an embodiment, the method may categorize a set of ten system metrics, K1-K10, as function 1, F1:[K1, K2, K3], having ranked values of [1, 0.8, 0.3], F2: [K4, K5], having ranked values of [0.8, 0.3], F3:[K6, K7, K8, K9], having ranked values of [1, 0.8, 0.3, 0.3], and F4: [K10], having a ranked value of [1]. In this embodiment, the categories are determined according to the expertise of the domain expert.

In an embodiment, the method performs a statistical correlation analysis of the system metric time series data. In this embodiment, the method calculates the correlation between each possible pair of metrics as a vector. The method further calculates the lag correlation between each pair with consideration of time shifts between the time-series data for the pair. The method progressively shifts the time-series data of one metric of the pair while calculating the pair's correlation after each shift to determine the time shift yielding the greatest correlation value for the pair. As an example, the method calculates the correlation between every 2 KPI values in the time series data as a vector. The method then shifts the time interval between the time series data of the two KPIs and calculates the correlation on the time shifted data. In an embodiment, the method calculates correlation for a time lag of zero up to a time lag of twenty, time intervals. The time interval may be selected according to the rate of the change of the KPIs over time—selecting an interval over which the KPIs change. The method outputs groups of metric pairings having similar levels of direct or lagging correlation. The method targets group sizes for correlated metrics of between N/2 and N, for a desired set of N system metrics. System metrics in a single group based upon direct or lagging correlation may be redundant in terms of system monitoring and present an opportunity to reduce the number of monitoring metrics required to analyze system performance. Only a single metric from a group of highly correlated metrics need be monitored. In an embodiment, the method utilizes a correlation algorithm such as the Pearson correlation coefficient or a similar algorithm.

In an embodiment, the method conducts machine learning-based anomaly analysis of system metric time-series data. In this embodiment, the method uses a machine learning model, such as a Gaussian model, or a Denoise autoencoder, to identify anomalous data. The method may consider directly reported data anomaly time ranges within the time-series data or may evaluate the data directly without reported anomalies to detect anomalous data time ranges. The method further analyzes the time-series data to identify system metric status change time ranges. The method may utilize reported metric status change time ranges or evaluate all the time-series data to detect status changes without using reported status change time ranges. The method utilizes a clustering algorithm such as k-means clustering, to group the time series data into two or more clusters for each reported or identified metric status change time range. The method labels the grouped time-series data as "0", or "1" according to the status of the data as normal/anomalous, or idle/busy, for the identified time ranges. For each identified anomaly or status change, the method outputs those metrics having the greatest sensitivity to the changes or anomalies according to a feature selection algorithm such as a decision tree or random forest algorithm. The method evaluates the system metric time-series data in terms of different anomaly types using algorithms such as isolated forest, dbscan, or an autoencoder, to identify anomalies in the time-series data. In an embodiment, the method imports pre-defined anomaly type definitions.

For each factor described, the method evaluates each system metric as either selected, or not selected. Selected metrics include those ranked as having high importance by a domain expert, those having high correlation, and those having a sensitivity to anomaly and system status changes.

In an embodiment, the method combines system metric correlation data and anomaly detection data for sensitive metrics. In one embodiment, the method further combines the domain expert system metric classification and ranking data. The method applies an integer linear optimization model to the combined input data. The method applies an initial weighting value to each of the correlation and anomaly data sets, as well as the domain expert data set when combining the correlation and anomaly data with such a data set. The method may further consider a desired number of important system metrics, N, as a fourth weighted parameter for the integer linear optimization model. The method runs the optimization model and evaluates the solution according to the desired metric number as well as desired coverage levels for the hierarchical tree of domain expert input, the correlation groupings, and the anomaly groupings. In an embodiment, the method receives user input regarding desired coverage levels for each input data set, or the method utilizes default coverage levels for each input set. The method considers the coverage of the selected metrics in terms of the sets of groupings determined for each input set. For embodiments without a defined N, the method seeks to optimize the constraints of each utilized input data set.

In an embodiment, input data set constraints include requiring the selection of at least one metric from each domain expert functional group, the selection of at least one metric from each for anomaly/status change grouping according to metric importance, and the selection of the desired number of metrics.

In an embodiment, the method considers objective equations for each of the factors. For the number of desired metrics factor, the method considers the number of selected metrics divided by the number of desired metrics. For the domain expert input factor the method considers the sum of the domain expert ranked importance values for each selected factor divided by the number of functional groupings. For the correlation input set, the method considers the number of correlation groups represented in the selected metrics divided by the total number of correlation groups. For the anomaly sensitivity set the method considers the sum of the selected metrics anomaly importance divided by the total number of anomalies.

Optimization considers and seeks to maximize the sum of the objective equations multiplied by the weighting for each factor considered from among the four possible factors (domain expert classification, correlation grouping, anomaly status change grouping, and desired number of metrics.) For each factor the method determines the objective calculation value and multiplies this value by the current weighting value for the factor. The factor weighting values sum to 1.

Exemplary factor weights relate to each of the four factors. The method utilizes a set W of weights w(0), w(1), w(2), w(3) for max metrics count, metrics functional importance, coverage on correlation group and importance on anomaly detection, respectively. For w(0)E[0,1], the weight for metrics selected count limitation, a heavier weight will force fewer metrics to be selected. For w(1) E[0,1], the weight for domain expert functional importance, increasing the weight enables more important metrics in functional areas to be selected. For w(2) E[0,1], the weight for correlation group coverage percent, a greater weight will result in metrics included in more groups being selected. For w(3) E[0,1], the weight for anomaly detection/status change, a greater weight will select metrics with more importance or the selection of more metrics from the anomaly detection/status change list.

In an embodiment, an automatic configuration to check the count of anomaly cases in historical data, for an anomaly frequency over a thresholder such as $1/10000$, the method will set W=(0.1, 0.1, 0.1, 0.7) to select more anomaly sensitive metrics. The selected metrics help to detect anomalies early in further system monitoring/analysis. Otherwise, identical weights of (0.25, 0.25, 0.25, 0.25) help to select a balanced metrics list. A balanced metrics listing covers the aspects of the set of system metrics equally without emphasis or preference for any particular system aspect.

In an embodiment, for monitoring in real time, the method utilizes W=(0.5, 0.3, 0.1, 0.1) to select a metrics list focused more on functional importance in a relatively small count N of metrics.

In an embodiment, for analysis of alert anomalies, the method utilizes W=(0.1, 0.1, 0.3, 0.5) to enable the selection of more sensitive metrics for anomaly detection and to cover more diverse groups on correlation.

In an embodiment, the method defines equal initial weightings for each input data set provided to the integer linear optimization model. The method may receive initial weightings from a user, or weighting adjustments from the user in response to an initial optimization model solution and a user desire to alter the solution through the weightings.

In response to the optimization results, the method ranks the system metrics according to the importance values from the optimization. The method may provide the desired number of ranked metrics N, provided by a user, or the method may derive a ranked number of system metrics according to the relative importance, using all metrics above a selected metric importance threshold, such as 0.8, 0.6, etc. The user may provide a threshold or may provide the explicit number N of desired system metrics. Absent user input regarding N, the method ranks metrics without regard to the N factor, effectively setting the weighting for this factor as zero.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise application program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the system metric ranking program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., system metric ranking program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
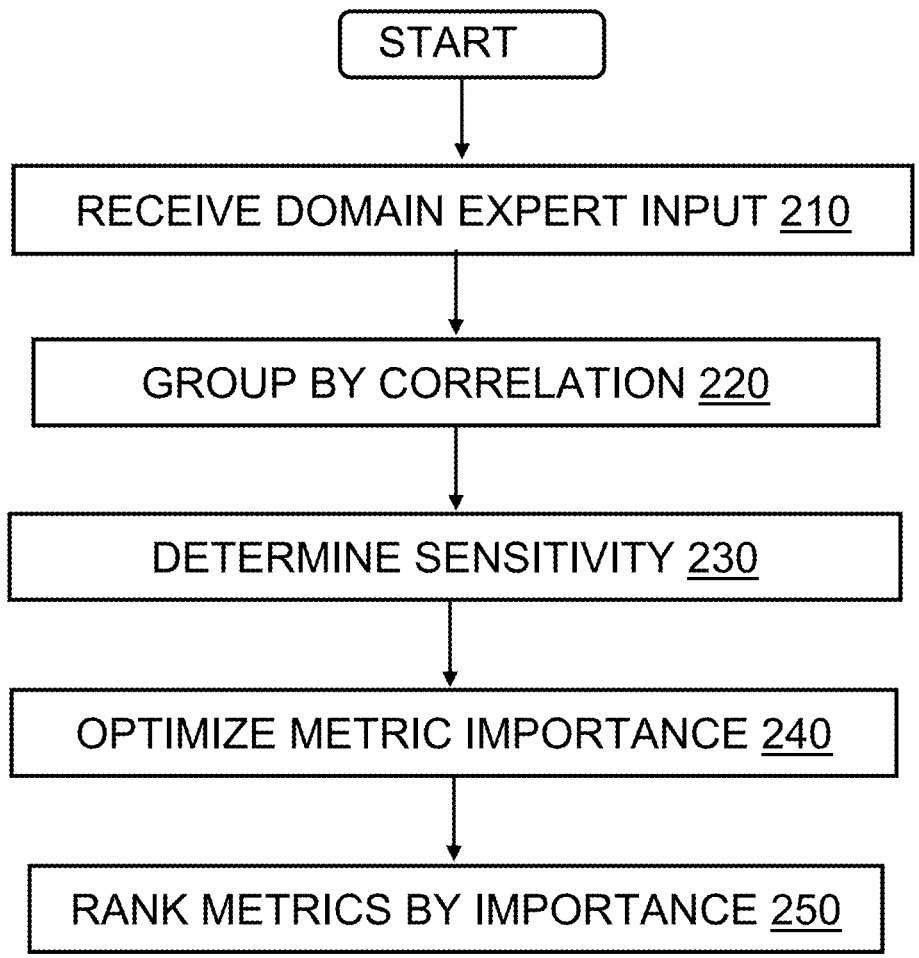
FIG. 2 provides a flowchart depicting an operational sequence, according to an embodiment of the invention.

FIG. 2 provides a flowchart 200, illustrating exemplary activities associated with the practice of the disclosure. After program start, at block 210, the method (e.g., program 175) receives system metrics grouped by a domain expert according to the functional area of the metric, and further ranked according to relative importance by the system expert. For example, metrics may be ranked as critical, nice to have, or normal metrics.

At block 220, the method groups the system metrics according to the degree of correlation between pairs of system metrics over the duration of the respective sets of time-series data for the metrics. The method considers both real-time correlations, how well the pair of metrics correlates along a common timeline, and lag correlations, how well the pair of metrics correlates when the values of one metric of the pair are shifted in time from the values of the other metric of the other pair. The method groups system metrics as highly correlated or not highly correlated. The method considers coverage of the correlation groups with respect to the overall set of system metrics. Groups of highly correlated metrics present an opportunity to reduce the number of monitored metrics by selecting a single metric from the group of highly correlated metrics.

At block 230, the method analyzes the system metrics in terms of the sensitivity of the metrics to system status changes and to anomalies in the time series data. The method uses machine learning models such as Gaussian models or autoencoders to detect metrics sensitive to data anomalies and system status changes. The method either utilizes provided status change and anomaly data, including time range data associated with the anomalies and status changes, or the method analyzes the system metric time-series data to identify status changes and anomalies in the time-series data.

At block 240, the method optimizes the view of the system metrics according to a combination of the domain expert input, the correlation groupings, the system metric sensitivity analysis, and also the number of desired ranked system metrics for the method output. The optimization yields an output of an importance for each system metric. In an embodiment, the method utilizes an integer linear optimization algorithm for ranking the system metrics in the view. The method considers domain expert input and the desired number of ranked system metrics as optional inputs, the ranked view of the metrics may be derived with or without these inputs. As an example, the method may rank the set of system metrics by optimizing the view of the metrics including only the correlation grouping factor combined with the system metric sensitivity analysis factor.

At block 250, the method ranks the members of the set of system metrics according to the importance determined in the optimization. The method provides the ranked system metrics as an output. The method may provide a desired number of ranked metrics as the output, or the method may provide a derived number of system metrics as the output. Monitoring and analysis of the system metrics included in the provided output may proceed through automated or manual systems. As an example, the real-time values of selected metrics may be automatically tracked and compared to metric control limits established for each selected metric. In an embodiment, the control limits are defined by a user such as a system expert. In an embodiment, the control limits may be established according to the typical range of values for each metric in order to identify anomalous values for the metric. In this embodiment, the method includes automated reporting of selected metrics having values outside established control limits.

In an embodiment, the method may include automated response steps associated with defined values for selected metrics. Alarms and other indicators, such as indications of normal or abnormal conditions may be generated using the real-time values of selected metrics.

Disclosed embodiments may be implemented utilizing local computing resources. Disclosed embodiments may also be implemented across networked resources and may benefit by implementation across networked computing environments affording access to edge cloud and cloud computing resources. Such an implementation enables more flexible practice of disclosed methods by allowing the methods to increase or decrease the utilized computing environment resources as needed or possible. Access to networked resources further enables the provision of system metric data sets and the output of ranked system metrics according to disclosed methods across network resources.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
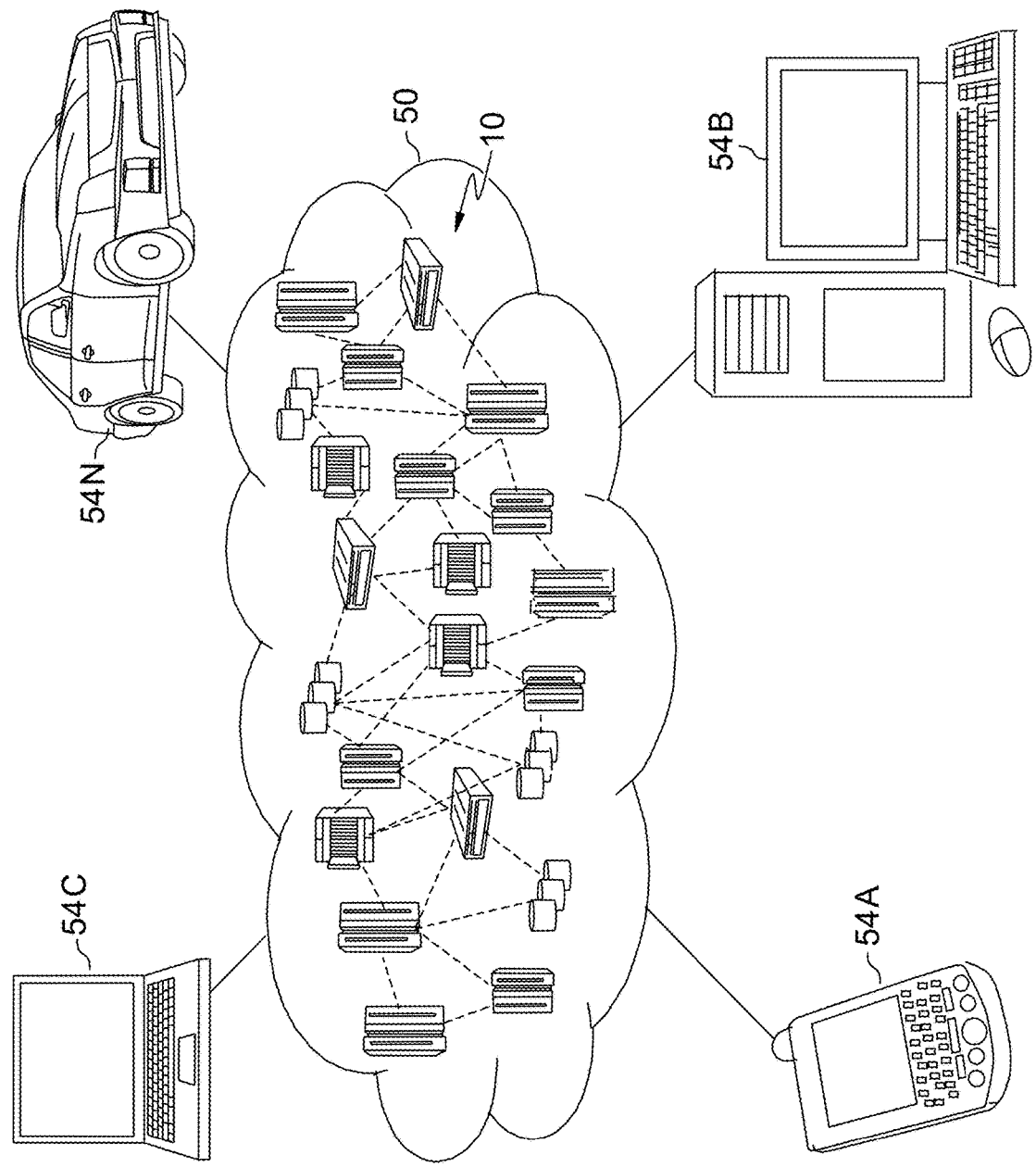
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
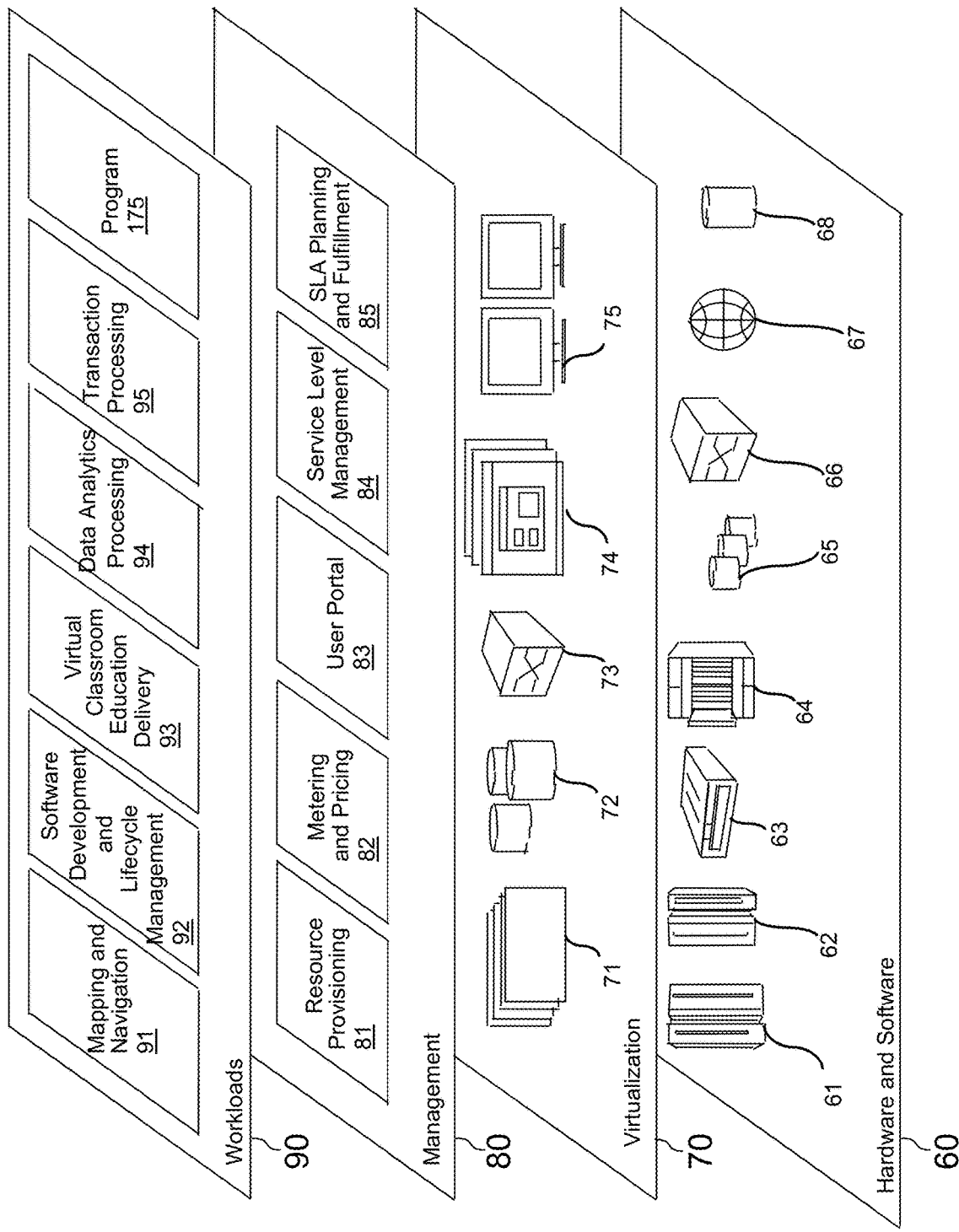
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system metric ranking program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for ranking system metrics, the method comprising:
    sorting, by one or more computer processors, members of a set of system metrics significant to the monitoring and analysis of system performance into correlation groups according to correlations among historic time series data of the system metrics;
    determining, by the one or more computer processors, a sensitivity of the members of the set of system metrics;
    determining, by the one or more computer processors, an importance of the respective members of the set of system metrics according to the correlation groups and the sensitivity;
    ranking, by the one or more computer processors, the members of the set of system metrics according to the importance;
    tracking, by the one or more computer processors, real time values of the members of the set of system metrics;
    generating, by the one or more computer processors, alarm condition indicators using the real time values of the members of the set of system metrics; and
    reporting, by the one or more computer processors, members of the set of system metrics having real time values outside established control limits.

2. The computer implemented method according to claim 1, further comprising:
    receiving, by the one or more computer processors, functional classifications and ranking data for the members of the set of system metrics; and
    wherein determining, by the one or more computer processors, the importance of the members of the set of system metrics includes determining importance according to the functional classifications, the ranking data, the correlation groups and the sensitivity.

3. The computer implemented method according to claim 2, the functional classifications and ranking data for the members of the set of system metrics comprising ranked tiers of system metric function areas.

4. The computer implemented method according to claim 2, the functional classifications and ranking data for the members of the set of system metrics comprising ranked system key performance indicators.

5. The computer implemented method according to claim 1, wherein grouping the members of the set of system metrics according to historic time series data correlation comprises calculating a lag correlation between two system metrics.

6. The computer implemented method according to claim 1, wherein determining the sensitivity of the members of the set of system metrics comprises determining system metric sensitivity to system anomalies.

7. The computer implemented method according to claim 1, wherein determining the sensitivity of members of the set of system metrics comprises determining system metric sensitivity to system status changes.

8. A computer program product for ranking system metrics, the computer program product comprising one or more computer readable storage devices and collectively stored program instructions on the one or more computer readable storage devices, the stored program instructions comprising:
    program instructions to sort members of a set of system metrics significant to the monitoring and analysis of system performance into correlation groups according to correlations among historic time series data of the system metrics;
    program instructions to determine a sensitivity of the members of the set of system metrics;
    program instructions to determine an importance of the members of the set of system metrics according to the correlation groups and the sensitivity;
    program instructions to rank the members of the set of system metrics according to the importance;
    program instructions to track real time values of the members of the set of system metrics;
    program instructions to generate alarm condition indicators using the real time values of the members of the set of system metrics; and
    program instructions to report members of the set of system metrics having real time values outside established control limits.

9. The computer program product according to claim 8, the stored program instructions further comprising:
    program instructions to receive, by the one or more computer processors, functional classifications and ranking data for the members of the set of system metrics; and
    program instructions to determine an importance of the members of the set of system metrics according to the functional classifications, the ranking data, the correlation groups and the sensitivity.

10. The computer program product according to claim 9, wherein the functional classifications and the ranking data for the members of the set of system metrics comprises ranked tiers of system metric function areas.

11. The computer program product according to claim 9, wherein the functional classifications and the ranking data for the members of the set of system metrics comprises ranked system key performance indicators.

12. The computer program product according to claim 8, wherein program instructions to group the members of the set of system metrics according to historic time series data correlation comprise program instructions to calculate a lag correlation between two system metrics.

13. The computer program product according to claim 8, wherein program instructions to determine the sensitivity of the members of the set of system metrics comprise program instructions to determine anomalous system metric features.

14. The computer program product according to claim 8, wherein program instructions to determine the sensitivity of the members of the set of system metrics comprise program instructions to determine system metric features status changes.

15. A computer system ranking system metrics, the computer system comprising:
 one or more computer processors;
 one or more computer readable storage devices; and
 stored program instructions on the one or more computer readable storage devices for execution by the one or more computer processors, the stored program instructions comprising:
  program instructions to sort members of a set of system metrics significant to the monitoring and analysis of system performance into correlation groups according to correlations among historic time series data of the system metrics;
  program instructions to determine a sensitivity of the members of the set of system metrics;
  program instructions to determine an importance of the members of the set of system metrics according to the correlation groups and the sensitivity;
  program instructions to rank the members of the set of system metrics according to the importance;
  program instructions to track real time values of the members of the set of system metrics;
  program instructions to generate alarm condition indicators using the real time values of the members of the set of system metrics; and
  program instructions to report members of the set of system metrics having real time values outside established control limits.

16. The computer system according to claim 15, the stored program instructions further comprising:
 program instructions to receive, by the one or more computer processors, functional classifications and ranking data for the members of the set of system metrics; and
 program instructions to determine an importance of the members of the set of system metrics according to the functional classifications, the ranking data, the correlation groups and the sensitivity.

17. The computer system according to claim 16, wherein the functional classifications and the ranking data for the members of the set of system metrics comprises ranked tiers of system metric function areas.

18. The computer system according to claim 16, wherein the functional classifications and the ranking data for the members of the set of system metrics comprises ranked system key performance indicators.

19. The computer system according to claim 15, wherein program instructions to group the members of the set of system metrics according to historic time series data correlation comprise program instructions to calculate a lag correlation between two system metrics.

20. The computer system according to claim 15, wherein program instructions to determine the sensitivity of the members of the set of system metrics comprise program instructions to determine anomalous system metric features.

\* \* \* \* \*